Figure 1:
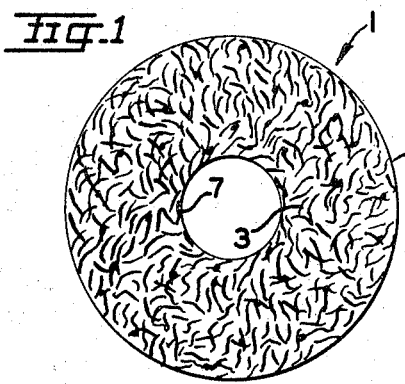

Sept. 22, 1970      V. K. CHARVAT      3,529,945
ROTARY BRUSHING TOOL CONTAINING NON-WOVEN FIBROUS MATERIAL
Filed Aug. 18, 1959      4 Sheets-Sheet 1

INVENTOR.
VERNON K. CHARVAT
BY
Oberlin, Maky & Donnelly
ATTORNEYS

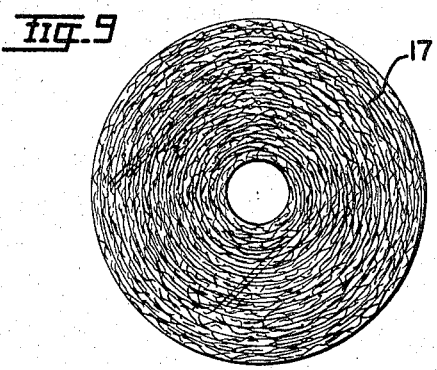
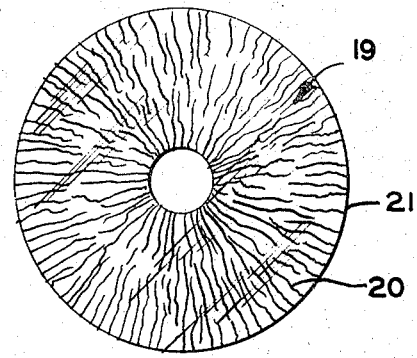
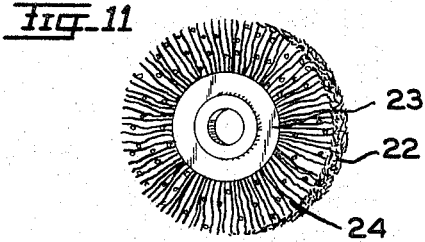
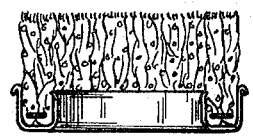
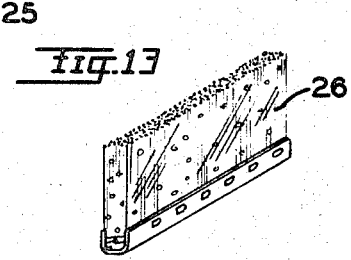
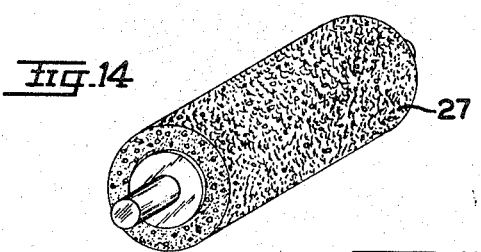
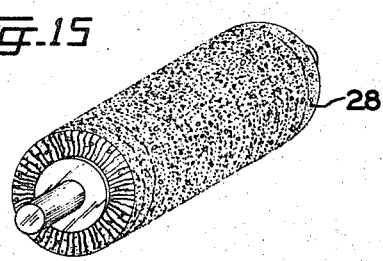
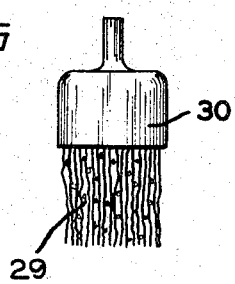
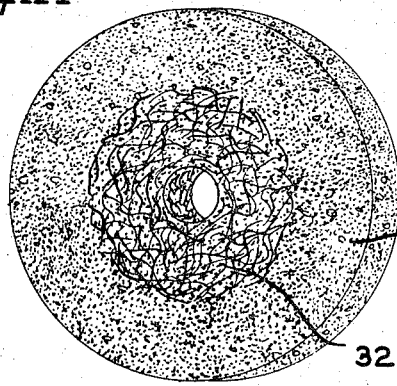

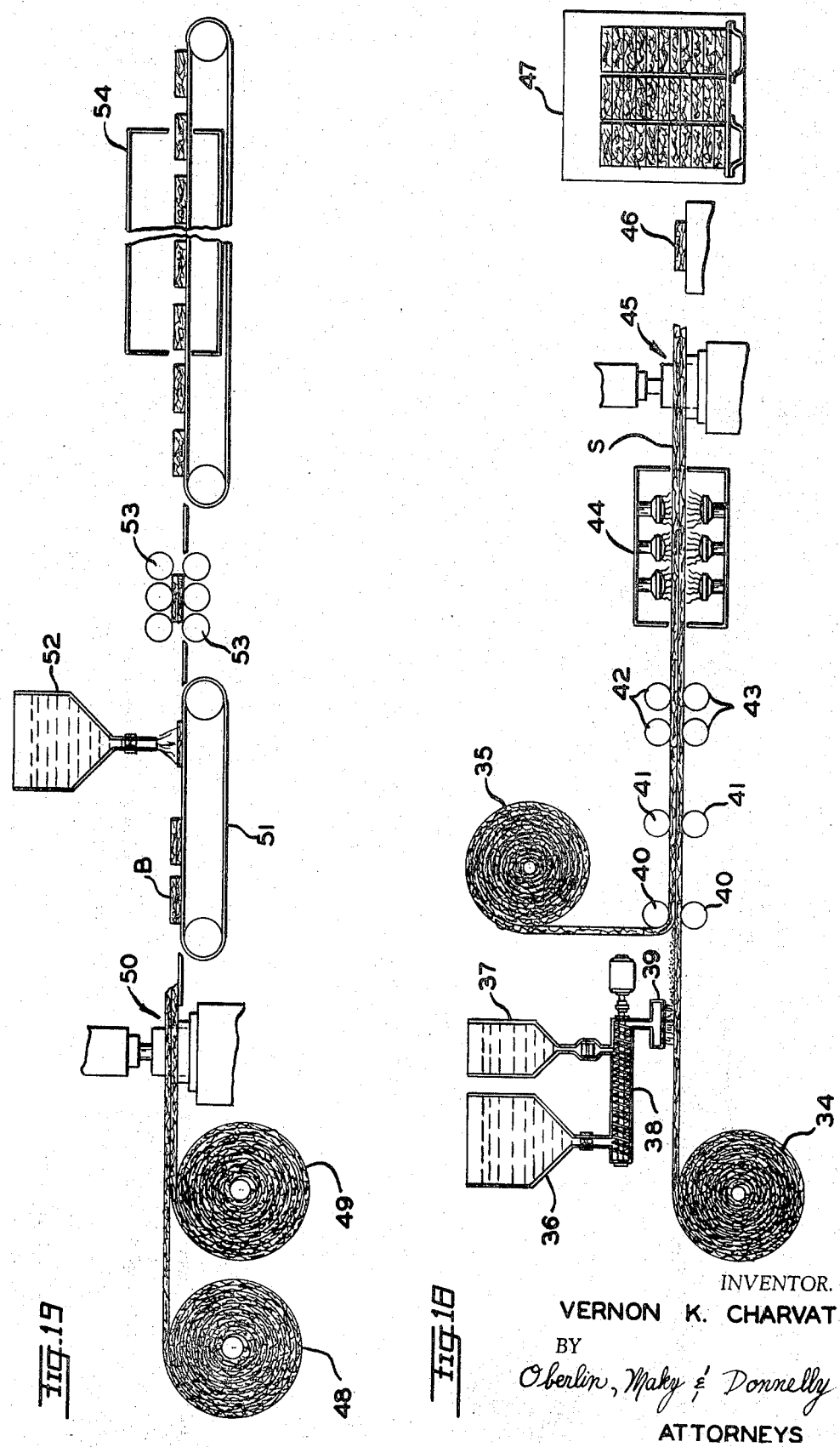

Sept. 22, 1970        V. K. CHARVAT        3,529,945
ROTARY BRUSHING TOOL CONTAINING NON-WOVEN FIBROUS MATERIAL
Filed Aug. 18, 1959        4 Sheets-Sheet 4
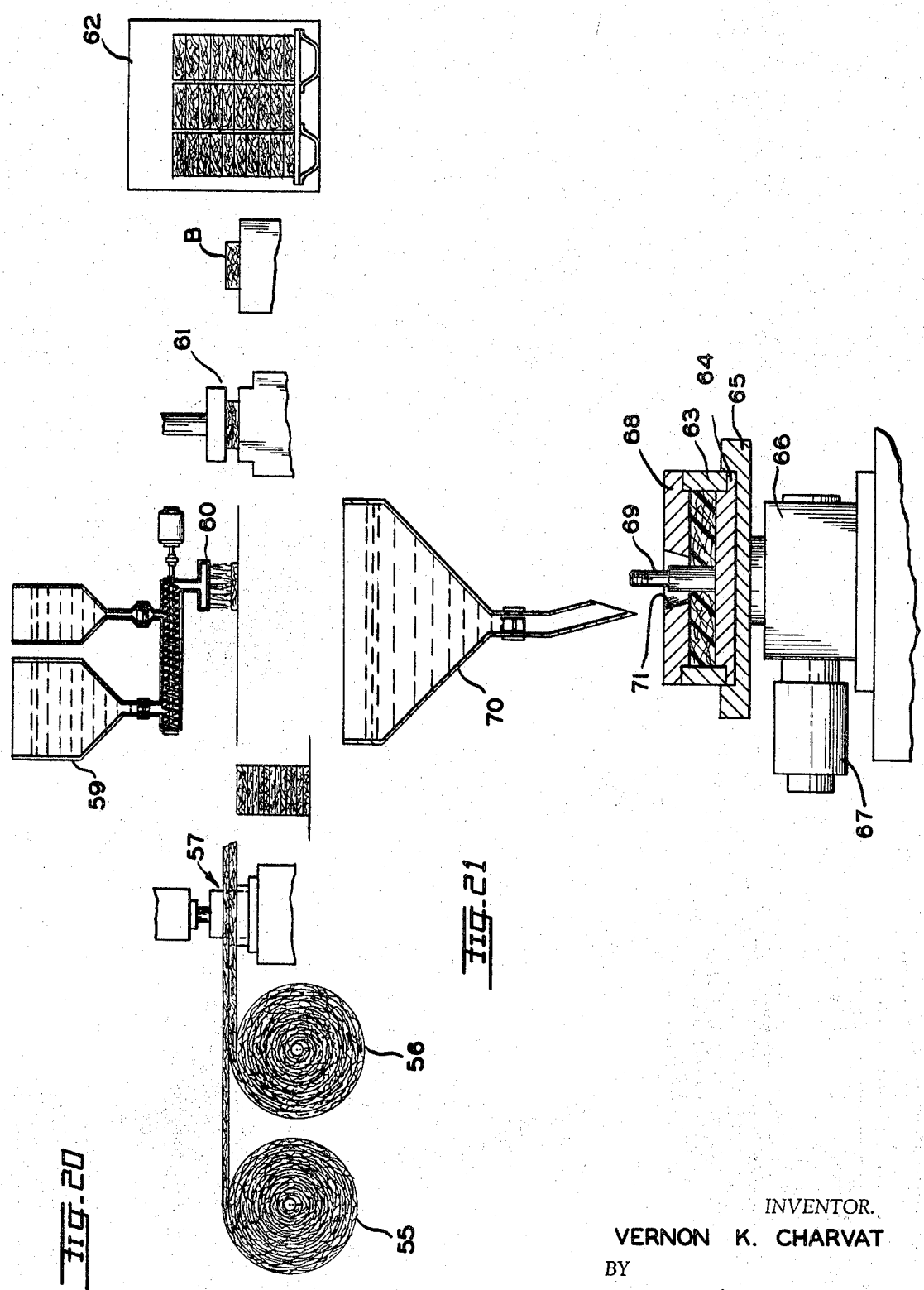
INVENTOR.
VERNON K. CHARVAT
BY
Oberlin, Maky & Donnelly
ATTORNEYS United States Patent Office 3,529,945
Patented Sept. 22, 1970

3,529,945
ROTARY BRUSHING TOOL CONTAINING NON-WOVEN FIBROUS MATERIAL
Vernon K. Charvat, Bay Village, Ohio, assignor to The Sherwin-Williams Company, a corporation of Ohio
Filed Aug. 18, 1959, Ser. No. 834,501
Int. Cl. B24b 1/00; B24d 3/100
U.S. Cl. 51—295                                    8 Claims This invention relates generally as indicated to abrading and finishing tools and more particularly to such tools incorporating therein fibrous or filamentous materials; and to various methods of making the same.

Power driven rotary brushes, buffs and the like have long been employed to impart particular finishes to work, such tools frequently incorporating therein abrasive materials either provided directly as by a "grease stick" or through the application of fluid having the abrasive entrained therein. Rotary brushes are generally, however, quite expensive to manufacture and require skilled craftsmen effectively to apply the abrasive thereto to impart to the work the required finish. The manual application of abrasive is also quite messy and tends to result in non-uniform production.

Grinding wheels that the currently manufactured ordinarily comprise a mass of densely compacted discrete abrasive grains bonded together by a molded and fired ceramic or resinous bonding agent. These wheels have been extremely difficult to manufacture requiring very careful placement of the granular abrasive therein and usually rather lengthy baking or curing periods. Many such wheels are quite fragile requiring careful handling and frequent dressing to insure maintenance of a uniform cut.

Accordingly, I have developed brushing and abrading tools capable of polishing and buffing surfaces, especially in the range of application adjacent to that done by grinding wheels, using a construction that comprises a rigid but deformable body providing a slowly yielding resistance for maximum normal pressure of abrasive against a workpiece. Within this deformable body, I provide fibrous or filamentous materials so disposed as to have pockets or other denticulate abrasive-capturing and holding cavities and tips.

Accordingly, a tool that will lend itself quickly and easily to manufacture and yet which will provide finishing characteristics adjacent the range provided by more expensive grinding wheels would be highly desirable.

It is for this reason a primary object of my invention to provide an abrading and finishing tool that can cheaply and easily be manufactured and yet will produce unexpectedly good finishing results.

It is another principal object of my invention to provide an abrading and finishing tool which will provide a finishing effect in a new range appears to be the result of both a grinding wheel and a buffing or brushing wheel.

It is a further object of my invention to provide an abrading and finishing tool that will not stain the work or become overheated to produce unwanted odors.

It is still another object of my invention to provide an abrading and finishing tool capable of reducing a surface to a very low microinch reading as a grinding wheel does and yet still obtain a relatively substantial amount of color or polish not normally produced except by a cloth buff used in a secondary operation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 2:
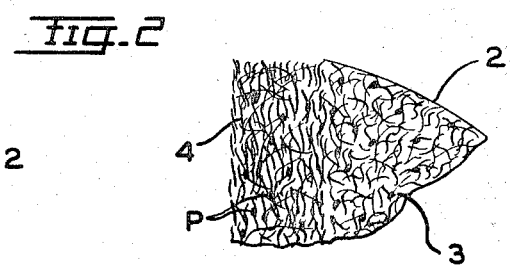
Figure 3:
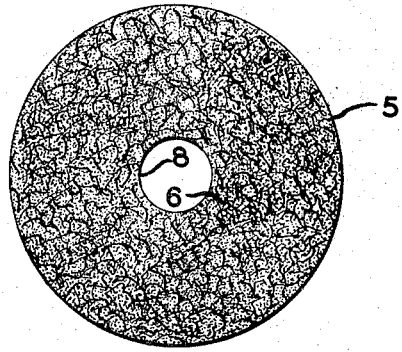
Figure 4:
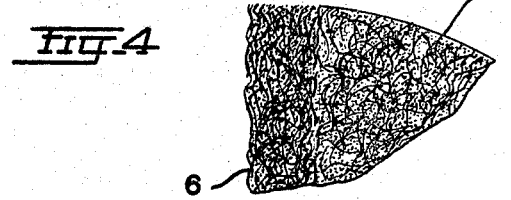
Figure 5:
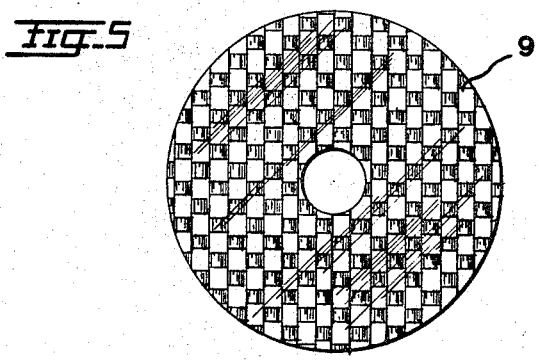
Figure 6:
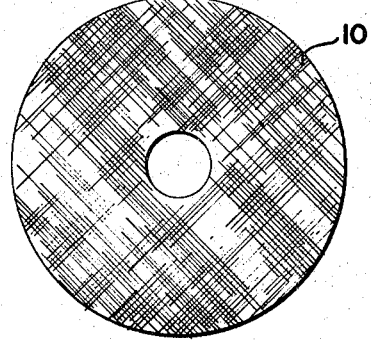
Figure 7:
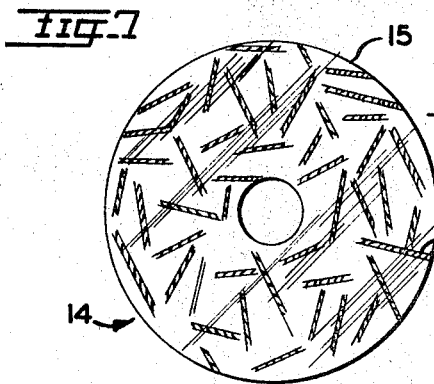
Figure 8:
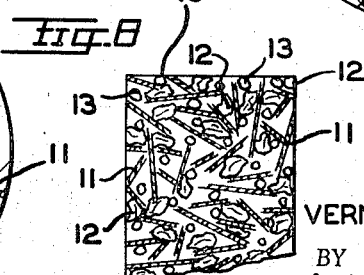

In said annexed drawings:
FIG. 1 is a plan view of a cutting and abrading tool built in accordance with my invention;
FIG. 2 is an enlarged fragmentary perspective view illustrating the open fibrous structure of the abrading tool shown in FIG. 1;
FIG. 3 is a plan view of another embodiment of my invention in which the abrading and finishing tool is substantially completely filled;
FIG. 4 is an enlarged fragmentary perspective view illustrating the structure of the tool shown in FIG. 3;
FIG. 5 is a plan view of another form of my invention utilizing a woven roving embedded in a plastic material;
FIG. 6 illustrates a further embodiment of my invention utilizing a woven cloth supported plastic wheel;
FIG. 7 is an illustration of yet another embodiment utilizing non-woven filaments randomly disposed in my plastic wheel;
FIG. 8 is a fragmentary sectional view illustrating the disposition of the filler material in the tool of FIG. 7;
FIG. 9 illustrates still another embodiment of my invention utilizing a spirally wound non-woven fibrous support;
FIG. 10 is another form of my invention utilizing wires oriented in a radial direction as the filamentous material of my tool;
FIG. 11 is a further form of my invention utilizing a conventional circular brush employing an annular retainer as the filamentous material.
FIGS. 12, 13, 14, 15 and 16 illustrate tool forms which may be utilized incorporating the principles of my invention;
FIG. 17 illustrates a plastic wheel built in accordance with my invention with the central portion only reinforced;
FIG. 18 illustrates the various steps that may be employed in one process to produce my finishing and abrading tools;
FIG. 19 illustrates a further method of producing my finishing and abrading tools;
FIG. 20 illustrates yet another form of producing my finishing and abrading tools; and
FIG. 21 illustrates a further method of forming my abrading tools through a centrifugal mold.

Referring now to the drawings, FIG. 1 illustrates one form of my invention employing a circular wheel or tool 1 for abrading and finishing purposes which comprises an outer face portion 2 and an inner body portion 3. The tool body consists primarily of a batt of fibrous material such as Tampico fibers. These Tampico fibers are commercially available in such batt form as Tulatex, a substance generally used in the manufacture of furniture as a fibrous stuffing material. These Tampico fibers are obtained from a plant of the Tula family and may also be called Istle, Ixtle or Mexican Tampico fiber. The batt of such fibrous material is generally treated with a suitable bonding material to maintain it in batt form. An example of such initial bonding agent is rubber latex which may, for example, be sprayed on the fibers in a relatively thin layer over a suction chamber. The batt is subsequently passed through a drying and vulcanization station effecting the proper cure for the bonding agent. The finished batt is generally in layer form with the fibers adhered together by such bonding agent. Other types of fibrous material such as sisal, cotton waste, rubberized fibers, or synthetic filaments may be employed.

When such Tampico fibers are subject to pressure or abrasion as would be encountered in their use as an abrading wheel, the fibers tend to shred and fly apart.

Accordingly, I employ a batt of such fibrous materials which is initially treated to maintain it in batt form, such form generally being a layer, and have died out a circular blank of the general configuration shown in FIG. 1. In order properly to use the resultant blank as an abrading or finishing tool, I have found it necessary to apply a further bonding agent to maintain the fibrous or filamentous elements in a strongly unitary condition.

With the tool form shown in FIGS. 1 and 2, only a sufficient amount of the further binding agent is required to interlock such fibers where they cross or are in contact so they will rigidly be maintained in such position. Not only does the additional binding agent provide a matrix for the tool firmly holding it in such circular shape, but it also adds body and support for the working face. The working face will, with the relatively small amount of further bonding agent, act substantially as a rotary brush with the exception that the fibers are positioned randomly in their direction of lie. Such further binding agent may, if desired, be formed to produce a unitary body resiliently but firmly cross-locking the fibers together and in this manner providing a body for the working face that will yield and flex to control the pressure on the work.

As a binding agent firmly to hold the fibrous materials together, I prefer to use polyurethane. Suitable polyurethane being, for example, produced in the following manner:

(1) By reacting a polyol, polyester, polyether or alkyd with an isocyanate utilizing a catalyst to enhance the rate of reaction.

(2) By reacting a polyol, polyester, polyether or elkyd with an isocyanate to form a prepolymer which contains an excess of isocyanate. Such prepolymer is then subsequently further reacted by employment of a catalyst such as an amine.

(3) By reacting a polyol, polyester, polyether or alkyd with a polyisocyanate.

In general, polyurethanes are formed by reaction of an isocyanate or diisocyanate with materials giving a positive Zerewitinoff Test (see "Polyurethanes" by Bernard A. Dombrow, published in 1957 by Reinhold Publishing Corporation, New York, for further particulars and especially a discussion of rigid, semi-rigid and flexible polyurethane foams).

I may, however, employ vinyl plastisols as the binding agent and more particularly a polyvinyl chloride having suitable plasticizers added thereto. Such vinyl plastisols are readily foamed and are quite applicable to the binding requirements for my tool.

Other such binding agents may be employed as, for example, the well known phenolic foams, silicone resin foams or foamed epoxy resins. However, the use of these foams, while they may be sufficient for certain finishing applications, the above-mentioned polyurethane resin has been found to be practically universally acceptable and is much preferred as the bonding agent for my tools.

Once the circular blank has been died out to the shape shown in FIG. 1, a suitable amount of the binding agent, preferably polyurethane, will be added thereto and intruded throughout the fibrous materials to bind and lock them together at their contacting points P to form a substantially integrated and yet substantially open rotary abrading and finishing tool. In the tool shown in FIG. 1, 90% of the volume of the tool is substantially open. In other words, the resin binder and the batt of fibers occupies but 10% by volume of the space occupied by the tool. It can now be seen that the tool shown is replete with open cavities which may receive abrasive materials. The tool can then be used as a brushing instrumentality with the fibers 4 being randomly positioned throughout the wheel so that at the face 2, they will project slightly in all directions. Consequently a brushing action is obtained which can further be enhanced as an abrading action by the application of suitable abradents by means of the conventional applicators aforestated. The substantially open tool just described constitutes one form of my invention.

Referring now to FIG. 3, I have shown a second form of my invention utilizing the same fibrous or Tampico fiber structure, but being substantially filled with preferably a foamed polyurethane. This tool has a similar outer workface 5 and a body 6. The tool itself may be made from a circular blank of the Tampico or Tulatex fibers but the polyurethane is introduced therethrough substantially completely to fill all the interstices within such fibrous batt. The polyurethane, of course, is reacted with a foaming agent or catalyst so that the fibrous body 6 will be resiliently deformable in supporting the workface 5. Since the fibers are arranged completely at random within the body, they will slightly protrude from the workface in a completely random manner. A suitable abradent may be incorporated within the resin in a manner hereinafter described, such that the tool will present a workface having both the random projecting fibers and abrading material dispersed therebetween. Both such tool forms as those shown in FIGS. 1 and 3 will, of course, have the circular openings 7 and 8 therein for the insertion of a suitable rotating arbor.

It can now be seen that my tool basically comprises a matrix of random stock distributed throughout the wheel, which creates a brushing face comprising a plurality of working tips which show a high degree of difference, composition and direction, length and angularity. In other words, a close visual inspection of the workface will not show a smooth cylindrical surface but rather one in which the differences in height and position of the filamentous stock are substantially varied through the full thickness of the working face. While the action of the face against the work does tend to directionalize the stock, this is at a minimum as compared with conventional buffing wheels where the fibers are generally laid substantially parallel and are concentric.

Thus my illustrated tools have a rigid body and are yet deformable, the majority of the body remaining substantially inactive until it becomes part of the workface as the diameter of the wheel becomes smaller. The inactivity of the body is due primarily to its resilience, and because of this, the working face remains very close to room temperature during operation. The cooling of the tool embodiment shown in FIG. 1 is even more substantial because of the tool being 90% open.

The open structures of both the tools of FIGS. 1 and 3 provide tips of pockets for catching and holding abrasive grains even more so than a conventional brush. The length of the working tips varies from 1/64 of an inch to 1/4 of an inch and accounts for the high cutting ability of the tool and its uniform action on hard and soft materials. This also explains the absence in a work surface of chatter marks which occur when using some types of wheels as, for example, grinding wheels or brushes.

Referring now to FIGS. 5 and 6, I have illustrated forms of my invention that may employ a woven roving wheel 9 as in FIG. 5 or a woven cloth wheel 10 as in FIG. 6. As can be seen in FIG. 5, the orientation of the tips of the material employed will be substantially random in that the fibrous materials will generally alternately be disposed normal to each other about the periphery of the working face. The same is true of the cloth-supported plastic wheel shown in FIG. 6. If desired, the roving or cloth may be laminated using the aforementioned vinyl plastisols as the binder. But I, however, prefer the use of the polyurethane which is foamed and may incorporate therein particulate and granular abrasive material.

FIGS. 7 and 8 illustrate a body of non-woven filament incorporated within the foamed plastic wheel. FIG. 8 shows the working face of the tool with the bubbles or cells positioned therein, the random fibers 11 and the particulate abrading elements 12 being held properly spaced by the cells 13. The abrasive grains 12 may be incorporated to produce an abrading tool having combined features of a brush and abrading wheel. The wheel 14 and its working face 15 are of the same configuration as the wheels shown in FIGS. 1, 3, 5 and 6.

In such body of non-woven filamentous material the random fibers may be loosely arranged or compacted to desired degree. There may be held together simply by the interlocking frictioinal engagement thereof or adhered together at points of contact. An example of non-woven filamentous material, in which the filaments are nylon thus adhered together, is that sold by the Minnesota Mining & Manufacturing Company under the trademark "Scotch Brite." This particular material also incorporates abrasive grains adhesively secured to the nylon filaments and thus serves to provide abrasive action when incorporated within the foamed plastic wheel. In such case it may be unnecessary to introduce additional abrasive material into the wheels as previously described in connection with the wheel illustrated in FIGS. 1 and 2, or by including such abrasive grains in the elastomeric material, e.g., polyurethane, used to form the finished article. By embedding the loosely held together nylon and abrasive combination in a polyurethane binder, it is possible to take such loosely held together product and, without changing the structural relationship, bind such nplon and abrasive together to act as a unit. Thus the filaments and abrasives are bound together in a desirable and flexible form which enhances its application but, more importantly, it makes a unit of the material which allows it to withstand greater pressure run at high speeds and so function at a rate of operation not previously possible.

Referring now to FIG. 9, I illustrate an alternative form of my wheel 16 employing a spirally wound non-woven supporting means 17. This non-woven supporting means may be a layer of the aforementioned Tampico fibers or any other type of loosely carded non-woven material as, for example, sisal, cotton waste, rubberized fibers or synthetic textile filaments. Again the workface to project through the plastic matrix to present denticulate openings for the ready retaining therein of abrasive material. Moreover, the fibers projecting from the face 18 will again be randomly disposed.

As a skeleton for these essentially plastic, brushing and abrading tools, I may further employ felted metallic or synthetic fibers again varying in length and direction of lie. The felted fibers may be heat treated at such temperature sufficient to fuse and bond the material together where they contact one another thus to form a comparatively rigid three-dimensional body. Each fiber may be bonded to adjacent fibers at comparatively few or many points. The labyrinthine structure thus formed has a high internal damping capacity and the interstices may be filled with the aforementioned foamed plastic materials to form a composite stucture of continuous, interpenetrating networks of fiber and plastic. In the felting of metallic fibers, such metals as nickel, cobalt base alloys, titanium, molybdenum, and, of course, steel may be utilized. As an example of the synthetic fibers which may be felted, I may use glass fibers, nylon monofilaments, rayon, or other synthetic fibers commonly used in textile applications.

As previously explained, the introduction of abrasive grains to obtain or increase the abrading action may be accomplished in several ways. Thus the abrasive material may be introduced into or rather applied to the wheel in use as in current brushing and polishing pratice. On the other hand, such abrading action may be achieved by intermixing with the elastomeric material, e.g., polyurethane, a suitable granular abrasive, the type, size and hardness depending on the particular result desired. Also, as indicated in connection with the previous description of FIGS. 7 and 8, which illustrates a body of non-woven filamentous material incorporated within the foamed plastic wheel body the abrasive grains may be adhesively secured to the component filaments.

Any suitable abrasive material may be utilized, as silicon carbide, aluminum oxide, emery, garnet, talc, pumice, or lime silicon dioxide. Grit sizes may vary from 600 to about 10 mesh, the ordinary range most frequently utilized being from 60 to 24 mesh. The aforementioned polyurethanes have been found to provide a high degree of adhesion both to abrasive grains and such fibers, coating the same while in liquid form to enhance the adherence of the elastomers, fibers and abrasives when such elastomer sets.

Referring now to FIG. 10, I illustrate another embodiment of my invention which may comprise a wheel 19 having therein radially oriented metal filaments 20. These filaments may be hardened steel similar to that employed in metal wire brushes. The plastic polyurethane may be molded therearound and is such as thoroughly to bond with the wire elements 20. The grip of the aforementioned polyurethane so tenaciously holds the wire bristles in the plastic matrix that no conventional hub or retaining means is necessary for the wire filaments. Accordingly, such illustrated radially disposed wire filaments embedded in a polyurethane matrix constitute all that is required for the formation of an adequate wire bristle finishing tool. The tips of the wire filaments will project slightly beyond the working face 21 to effect a brushing or abrading action to the work. The plastic matrix for the wheel 21 will preferably be foamed and incorporate therein a suitable abrasive material. This abrasive may be centrifuged to position it radially outwardly adjacent the workface in a manner hereinafter described. It will be understood that the size of the non-woven filaments may vary and in fact I may employ textile or rope cords cut into short lengths and randomly disposed in the plastic matrix.

It will, of course, be understood that the wheels shown in FIGS. 5, 6, 7, 9 and 10 will preferably be used with the FIG. 3 embodiment or more solid wheel having incorporated therein a complete matrix, preferably foamed polyurethane.

FIGS. 11 through 18 illustrate various conventional tool forms which may incorporate therein a complete foamed plastic matrix of the aforementioned polyurethane. This complete matrix considerably improves the brushing action, reduces the always troublesome long fracture, especially in wire bristle brushes, and the polyurethane employed produces improved results in that it does not permit the brush to heat excessively and is much more readily deformable, moreover, it is of such strength that it will not let the brush or wheel explode or fly apart at excessive r.p.m.'s.

FIG. 11 illustrates a conventional brush in which the bristles 22 are retained within a hub 23 and in which the bristles are embedded in a foamed, preferably polyurethane plastic matrix 24. Abrasive elements may be incorporated therein and distributed throughout the bristles to lie adjacent the workface. FIG. 12 illustrates a plastic again may or may not incorporate an abrasive material reinforced cup brush 25 utilizing twisted bristles which again may or may not incorporate an abrasive material within the foamed plastic martix.

FIG. 13 illustrates a conventional brush strip 26 incorporating a foamed polyurethane matrix therein extending the length of the bristle. It will be understood that the fibers may be oriented as shown or be randomly disposed in such strip.

It will be understood that where a cylindrical brush of considerable longitudinal extent is desired, any required number of individual disks or wheels, such as illustrated in FIGS. 1, 3, 7 and 10, may be assembled side by side on a suitable arbor. Similarly, any number of radial bristle brushes, as illustrated in FIG. 11 or the brush strip of FIG. 13, may be assembled to provide a cylinder brush, as shown in FIGS. 14 and 15, respectively.

The brush 28 shown in FIG. 115 may be formed by a helically coiled strip as that shown in FIG. 13. Again, the brush of FIGS. 14 and 15 may incorporate therein an abrasive material disposed adjacent the workface.

FIG. 16 illustrates an end brush 29 similar to that shown in FIG. 12 in which the bristles may be secured in a cup 30 to project therefrom and be enclosed in a similar foamed polyurethane matrix.

FIG. 17 illustrates a further embodiment in which a tool 31 may incorporate an inner annular hub 32 utilizing a reinforced central portion which may be similar to the circular die illustrated in FIGS. 1 and 3. The tool 31 has an outer workface portion 33 substantially free of the reinforcing fibers provided by the annular portion 32. Again, a polyurethane foam may be provided incorporating abrasive material therein. The foamed matrix will, of course, extend inwardly to enclose the fibers in the reinforced portion 32 to produce a unitary tool.

FIG. 18 illustrates a process for producing my improved abrading and finishing tools. A batt of the aforementioned Tampico fibers or Tulatex, for example, in rolled layer form is provided at 34 and a similar supply at 35. A supply of the polyurethane constituents 36 together with the required catalyst 37 are mixed and forced by, for example, a helical conveyor 38 to pass through distributing nozzle 39. As can be seen, the fluid is applied to the top of the batt being unrolled from supply 34. The batt from supply 35 is then passed over the top of the lower batt and through impregnating rolls 40. If desired, I may provide a set of auxiliary impregnating rolls 41 and two pairs of bubble control rolls 42 and 43. The impregnating and bubble control rolls will firmly compress the batts of fibers to intrdude the binder substantially completely throughout the fibrous supply. It will, of course, be understood that by use of the appropriate illustrated meters the supply may be controlled to produce either the substantially open tool shown in FIG. 1 or the substantially filled tool shown in FIG. 3. From the bubble control rolls, the layer of material or stock S passes through a pre-baking oven 44 and into a blanking machine 45 where the circular blanks 46 are cut from the layer S. As a subsequent or final operation, the blanks are cured in a final baking oven 47 to effect the proper cure of the plastic binder material employed. I have found that a single coil of fibrous material 34 may be employed and the plastic material applied thereto and then passed through appropriate squeeze impregnating rolls thoroughly to intrude the plastic material throughout the fibers. Again, the amount of plastic material employed will govern the production of either the substantially open or substantially completely filled tool.

FIG. 19 shows schematically a production line for making wheels using, for example, the aforementioned polyvinyl chloride and a plasticizer as the treating material. Again, two supplies of such fibrous material 48 and 49 are employed which are passed initially through the blanking operation 50. The blanks B are then set on a conveyor 51 to have individually applied thereto the plastic in fluid form from the container 52. The material applied may then be sandwiched between two such blanks and passed through squeeze or impregnating rolls 53. The resulting blanks are then conveyed through a final heating oven 54 to effect the proper cure of the resin applied.

FIG. 20 illustrates an alternative form of manufacturing my abrading and finishing tool utilizing the preferred polyurethane resin. Again, two sources of supply 55 and 56 may be employed to supply the fibrous material to a blanking operation 57. The blanks are then treated with the polyurethane constituents from container 59 through nozzle 60. A platen press 61 may be employed to intrude the plastic material throughout the fibrous batt and a final baking operation may be accomplished in oven 62 to effect the proper curing of my abrading and finishing tool.

It will be realized, of course, that the processes abovedescribed may employ the annular brush tool illustrated in FIG. 11. In such process, the brushing tool, which may, for example, be a circularized brush strip or merely a circular brush utilizing an annular retaining ring with the bristles folded therearound and uniformly circumferentially spaced thereon either as a complete brush or as merely a loosely circularized group of bristles, may be substituted for the died out blank of fibrous material and passed through the plastic applying step, the intruding step, either by platen or pressure rolls, and through the subsequent baking and curing steps. In this manner, a brushing tool having radially oriented fibers is quickly and easily produced at much reduced cost. The retaining ring initially positioned in the brush fibers may be used in a similar manner to the initial bonding agent in the fibrous or Tulatex material, this being merely to retain the loose fibers in the desired position. Most such commercially available brushes that resemble the ones produced by this method have to be carefully produced from molds enclosing the peripheral portions thereof and as a result, cannot be continuously made but must be made individually or in batches. Thus, it will be seen that a tremendous cost saving can be effected by my aforementioned continuous process.

In the manufacture of such tools as shown in FIGS. 5, 6, 10 and 11, for example, a rotating mold may preferably be employed in which the filamentous material is placed. As shown in FIG. 21, I may manufacture such abrading and finishing tools employing an annular mold 63 having its base 64 inset in a turntable 65 adapted to be rotated about its vertical axis by worm gear unit 66 driven by, for example, an electric motor 67. The mold may be provided with a removable cover 68 through which may axially protrude stud 69. In this method, the cover is removed and the fibrous or filamentous circular blank is placed therein and a measured quantity of fluid or unset resin, such as the aforementioned polyurethane constituents is discharged from reservoir 70 into the central opening 71 and the turntable is revolved to cause the resin to flow radially outwardly and be distributed throughout the radial extent of the tool. As a subsequent step, a granular abrasive material may be discharged from a hopper in the mold and under the influence of centrifugal force will flow outwardly into the previously deposited resin through which it migrates toward the outer periphery of the mold cavity accumulating in a uniform manner in a radially outer circumferential region with a small quantity of the resin filling the interstices between the abrasive grain. The abrasive grain may, however, be premixed with the polyurethane constituents and will collect uniformly around the working face of the tool as the mold is rotated.

After the polyurethane consituents are within the rotating mold and the abrasive has migrated therethrough to the periphery or face portion of the tool, a catalyst may be employed as, for example, water to produce carbon dioxide to cause a blowing or forming of the compound. This blowing or forming now inwardly expands the plastic resin completely substantially to fill the body of the tool.

The blanks formed from the batts of fibrous material may be placed directly into the rotatable mold and the resin will migrate therethrough, including the entrained abrasive, to be uniformly positioned around the periphery of the tool. The subsequent foaming operation will thoroughly intrude or position the foamed plastic resin throughout the area of the tool.

The aforedescribed foaming operation slightly spaces the abrasive grains apart and holds the fibrous material properly spaced so that they may be substantially in a non-contacting relation in certain forms of my tool. The use of polyurethane foam gives the tool a dimensional stability and yet permits such abrasive grains and fibrous material to be individually independently movable when in contact with the work. As a result, there is much less tendency for the fibers or grains to become dislodged and accordingly a much longer tool life may be expected.

If desired, brushes may be positioned in such rotating mold and the plastic and abrasive placed therein in a similar manner such that the plastic will be forced radially outwardly along the bristles and the abrasives will migrate therethrough to collect uniformly around the peripheral working face of such brushing tool.

It can now be seen that I have made available a brushing and abrading tool capable of polishing and buffing surfaces, especially in a range of application usually held by grinding wheels. The use of my readily formed blank of fibrous material makes such tool extremely cheap and easy to manufacture. The body of the tool being substantially rigid and dimensionally stable provides a slowly yielding resistance for maximum normal pressure of abrasive against a workpiece and accordingly, permits the tool to operate without excessive heating. The fibrous material is generally as irregular as possible, having random cross-section, both across and lengthwise of the working face, with fibers composing the material of the tool disposed as to have pockets and other denticulate abrasives capturing and holding cavities or tips. The directions of lie of the fiber are as random as possible both with regard to length and position.

In summary, I have provided a readily manufactured abrading and finishing tool which will produce unexpectedly good finishing results and yet can be cheaply and easily manufactured as a result of the use of material not normally considered feasible for the production of power driven rotating abrading and finishing tools.

Other modes of applying the principles of the invention may be employed, change being made as regards the details described, provided the features stated in any of the following claims or the equivalent of such be employed.

I, therefore, particularly point out and distinctly claim as my invention:

1. A rotary abrasive brushing tool comprising a matrix of adhesive resin binder, discrete abrasive material densely peripherally incorporated therein, and a preformed, self-supporting skeletal structure of randomly disposed non-woven fibrous material adhesively interconnected into said skeletal structure by a first adhesive extending throughout said wheel, a multitude of small cells in said matrix in the interstices between the elements of abrasive material slightly spacing said abrasive apart, said fibrous material slightly projecting randomly through the outer peripheral face of said wheel and presenting a multiplicity of denticulate abrasive capturing projects providing a brushing action for said wheel.

2. A rotaryl abrasive wheel comprising a matrix of adhesive resin binder, discrete abrasive material densely peripherally incorporated therein and a preformed, self-supporting skeletal structure of randomly disposed non-woven fibrous material adhesively interconnected into said skeletal structure by a first adhesive extending throughout said wheel, a multitude of openings in said matrix in the interstices between the filaments of said fibrous material, said fibrous material projecting slightly beyond the workface to present a plurality of denticulate elements to capture and retain such abrasive material therein while providing a brushing action.

3. An abrasive wheel as set forth in claim 2 wherein the outer matrix region of said wheel is supported by a radially inward region of said resin having relatively negligible abrasive content.

4. An abrasive wheel as set forth in claim 2 wherein said resin binder is polyurethane and said fibrous material is Tampico.

5. The method of producing a rotary finishing tool comprising the steps of placing a circularized blank of a preliminary interconnected three-dimensional skeletal structure of fibrous material in an annular mold having a central opening therein, rotating such mold and adding a liquid plastic material through such opening to be centrifugally forced outwardly through such fibrous material to be uniformly positioned around the periphery of such mold, adding abrasive grains through such opening to migrate such grains through such plastic material and such fibrous blank to position the abrasive grains substantially uniformly about the periphery of such mold, subsequently foaming such plastic material completely to fill the inner annular portion of such mold and slightly to space such abrasive grains apart.

6. The method of claim 5 wherein such plastic material is polyurethane.

7. The method of claim 6 wherein such fibrous material is a circularized blank of Tampico fibers and such abrasive grains are aluminum oxide.

8. The method of producing a rotary finishing tool comprising the steps of placing a preformed circularized blank of an adhesively interconnected skeleton of fibrous material in an annular mold having a central opening therein, rotating such mold and adding a liquid plastic material through such opening to be centrifugally forced outwardly through such fibrous material to be uniformly positioned around the periphery of such mold, and subsequently foaming such plastic material completely to fill the inner annular portion of such mold.

References Cited

UNITED STATES PATENTS

| | | | |
|---|---|---|---|
| 2,885,276 | 5/1959 | Upton | 51—298 |
| 2,881,065 | 4/1959 | Reuter | 51—298 |
| 1,826,300 | 10/1931 | Chapell | 51—293 |
| 2,073,590 | 3/1937 | Sanford | 51—298 |
| 2,768,483 | 10/1956 | Hurst | 51—293 |
| 2,800,403 | 7/1957 | Bosler et al. | 51—298 |
| 2,860,961 | 11/1958 | Gregor et al. | 51—298 |
| 2,327,199 | 8/1943 | Loeffler | 51—293 |
| 2,862,806 | 12/1958 | Nestor | 51—295 |
| 3,055,848 | 9/1962 | Heckmaier et al. | 260—2.5 |
| 3,066,110 | 11/1962 | Cornell | 260—2.5 |

DONALD J. ARNOLD, Primary Examiner

U.S. Cl. X.R.

51—296, 298, 299